US009591080B2

(12) United States Patent
Zhao et al.

(10) Patent No.: US 9,591,080 B2
(45) Date of Patent: Mar. 7, 2017

(54) METHOD OF ESTABLISHING A NETWORK SOCKET WITH A DATA SERVER

(71) Applicant: Tencent Technology (Shenzhen) Company Limited, Shenzhen (CN)

(72) Inventors: Yi Zhao, Shenzhen (CN); Jiazhong Shen, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 653 days.

(21) Appl. No.: 14/080,728

(22) Filed: Nov. 14, 2013

(65) Prior Publication Data

US 2014/0082150 A1 Mar. 20, 2014

Related U.S. Application Data

(63) Continuation of application No. PCT/CN2013/083561, filed on Sep. 16, 2013.

(30) Foreign Application Priority Data

Sep. 17, 2012 (CN) .......................... 2012 1 0344201

(51) Int. Cl.
*G06F 15/16* (2006.01)
*H04L 29/08* (2006.01)
(Continued)

(52) U.S. Cl.
CPC ........ *H04L 67/141* (2013.01); *H04L 67/2814* (2013.01); *H04L 41/0668* (2013.01);
(Continued)

(58) Field of Classification Search
CPC ............. H04L 67/2814; H04L 67/1002; H04L 67/1004; H04L 47/125; H04L 2029/06054;
(Continued)

(56) References Cited

U.S. PATENT DOCUMENTS 6,078,960 A * 6/2000 Ballard ............... H04L 67/1008
709/203
6,108,300 A * 8/2000 Coile .................. G06F 11/2005
340/2.9
(Continued)

FOREIGN PATENT DOCUMENTS

CN 1631016 A 6/2005
CN 102047643 A 5/2011
(Continued)

OTHER PUBLICATIONS

Tencent Technology, ISRWO, PCT/CN2013/083561, Dec. 26, 2013, 7 pgs.
(Continued)

*Primary Examiner* — Liangche A Wang
*Assistant Examiner* — Johnny Aguiar
(74) *Attorney, Agent, or Firm* — Morgan, Lewis & Bockius LLP

(57) ABSTRACT

A computer-implemented method is performed by a client machine to establish communication with a data server. The client machine sends a first communication request to a directory server having information concerning available data servers that provide specific data to the client machine. The client machine further determines whether a first socket is established to allow communication with the directory server within a first predetermined period of time. When the first socket is established, the client machine receives the information concerning the available data servers from the directory server and establishes a target socket with a data server selected from the available data servers for receiving the specific data. However, when the first socket is not established, the client machine sends more communication requests to secondary servers according to a predetermined
(Continued)

order, until the client machine receives the information concerning the available data servers or the specific data.

20 Claims, 8 Drawing Sheets

(51) Int. Cl.
 *H04L 12/24* (2006.01)
 *H04L 12/703* (2013.01)
 *H04L 29/14* (2006.01)

(52) U.S. Cl.
 CPC .......... *H04L 45/28* (2013.01); *H04L 67/1002* (2013.01); *H04L 67/1004* (2013.01); *H04L 67/1034* (2013.01); *H04L 69/40* (2013.01)

(58) Field of Classification Search
 CPC ..... H04L 67/1034; H04L 69/40; H04L 45/28; H04L 49/557; H04L 41/0668; H04L 67/141
 USPC ....... 709/217, 219, 223, 224, 227, 238, 239; 714/4.11
 See application file for complete search history.

(56) References Cited

U.S. PATENT DOCUMENTS

| | | | | |
|---|---|---|---|---|
| 6,298,451 B1* | 10/2001 | Lin | ........................ | G06F 9/5055 714/2 |
| 8,243,589 B1* | 8/2012 | Trost | ................... | H04L 67/1034 370/220 |
| 2002/0152322 A1* | 10/2002 | Hay | ........................ | H04L 29/06 709/245 |
| 2003/0061356 A1* | 3/2003 | Jason, Jr. | ............ | H04L 41/5035 709/227 |
| 2003/0126200 A1* | 7/2003 | Wolff | ........................ | G06F 9/52 709/203 |
| 2005/0159927 A1* | 7/2005 | Cruz | ........................ | G06F 9/465 702/188 |
| 2007/0060096 A1 | 3/2007 | Hayakawa | | |
| 2008/0276002 A1* | 11/2008 | Jiang | ........................ | H04L 45/00 709/241 |
| 2012/0278439 A1* | 11/2012 | Ahiska | ................... | H04L 65/105 709/218 |

FOREIGN PATENT DOCUMENTS

| | | |
|---|---|---|
| CN | 102105867 A | 6/2011 |
| CN | 102289508 A | 12/2011 |
| CN | 102340554 A | 2/2012 |
| CN | 202309766 U | 7/2012 |
| EP | 2051169 A1 | 4/2009 |
| JP | 2003115861 A | 4/2003 |
| JP | 2007081759 A | 3/2007 |
| JP | 2008028773 A | 2/2008 |

OTHER PUBLICATIONS

Tencent Technology, IPRP, PCT/CN2013/083561, Mar. 17, 2015, 5 pgs.

* cited by examiner

100

200

METHOD OF ESTABLISHING A NETWORK SOCKET WITH A DATA SERVER

RELATED APPLICATION

This application is a continuation application of PCT Patent Application No. PCT/CN2013/083561, entitled "Method of Establishing a Network Socket with a Data Server" filed on Sep. 16, 2013, which claims priority to Chinese Patent Application No. 201210344201.4, entitled "Method of Establishing a Network Socket," filed on Sep. 17, 2012, both of which are incorporated by reference in their entirety.

FIELD OF THE INVENTION

The present invention generally relates to a communication system, in particular to a computer-implemented method of establishing a network socket between a client machine and a data server that provides application data used to run an application on the client machine.

BACKGROUND OF THE INVENTION

In many internet gaming applications, data concerning gaming environments are provided to each client machine by a particular data server selected from several data servers in a network according to respective load conditions of these data servers. FIG. 1 illustrates an existing communication system 100 that is configured to support an online gaming application. A client machine 11 first downloads source programs from a resource server 12. Up completion of downloading the source programs, client machine 11 sends a request to establish a network socket with a data server to a directory server 14. Directory server 14 monitors the load conditions of data servers 13 in the network and keeps tracks of a list of available data servers 13. Therefore, directory server 14 returns the list of available data servers 13 to client machine 11, which thereby establishes a network socket with one of available data servers 13.

Despite its acceptable performance, the communication system 100 is plagued with several problems that significantly impact user experiences with internet gaming. When available data servers (e.g., server 131 or 132) tracked by directory server 14 are hosted by more than one service providers, directory server 14 may mistakenly provide client machine 11 registered with one service provider with an IP address of a data server that belongs to another service provider. This occurs primarily because directory server 14 maps IP addresses to wrong domain names for data servers 13 that correspond to the different service providers.

Under some circumstances, client machine 11 waits for directory server 14 to return an IP address of an available data server within a predetermined period of time, e.g., 20 seconds. Although this period of time already has an extended length, directory server 14 may still require a longer time to return the IP address for one of available data servers 13. On the other hand, even if directory server 14 returns the IP address at the end of the predetermined period of time, the actual IP address of the corresponding data server may have already changed because of the extended length of time used by directory server 14. As a result, no valid IP address is returned to client machine 11 within the predetermined period of time, and despite the wait over the extended length of time, client machine 11 still fails to establish the network socket to receive data concerning gaming environments from an available data server.

Therefore, a need exists to efficiently utilize resources in a communication system such that information of an available data server may be promptly returned to improve user experiences in an online gaming application based on such a communication system.

SUMMARY

The above deficiencies and other problems associated with a communication system are reduced or eliminated by the invention disclosed below. In some embodiments, the invention is implemented in a computer system that has one or more processors, memory and one or more modules, programs or sets of instructions stored in the memory for performing multiple functions. Instructions for performing these functions may be included in a computer program product configured for execution by one or more processors.

One aspect of the invention involves a computer-implemented method performed by a client machine to establish communication between the client machine and a data server. The client machine sends a first communication request to a directory server, and the directory server has information concerning available data servers that provide specific data to the client machine. The client machine determines whether a first socket is established to allow communication with the directory server within a first predetermined period of time. In accordance with a determination that the first socket is so established, the client machine receives the information concerning the available data servers from the directory server via the first socket and establishes a target socket with a data server selected from the available data servers for receiving the specific data. However, in accordance with a determination that the first socket is not established, the client machine sends a plurality of communication requests to a plurality of secondary servers according to a predetermined order, until the client machine receives the information concerning the available data servers or the specific data.

Another aspect of the invention involves a computer system, such as a client machine. The client machine includes one or more processors, and memory having instructions stored thereon, which when executed by the one or more processors cause the processors to send a first communication request to a directory server having information concerning available data servers that provide specific data to the client machine; determine whether a first socket is established to allow communication with the directory server within a first predetermined period of time; in accordance with a determination that the first socket is established, receive the information concerning the available data servers from the directory server via the first socket and establish a target socket with a data server selected from the available data servers for receiving the specific data; and in accordance with a determination that the first socket is not established, send a plurality of communication requests to a plurality of secondary servers according to a predetermined order, until the client machine receives the information concerning the available data servers or the specific data.

Another aspect of the invention involves a non-transitory computer readable storage medium having stored therein instructions, which when executed by a computer system (e.g., a client machine) cause the computer system to send a first communication request to a directory server having information concerning available data servers that provide specific data to the client machine; determine whether a first socket is established to allow communication with the directory server within a first predetermined period of time;

in accordance with a determination that the first socket is established, receive the information concerning the available data servers from the directory server via the first socket and establish a target socket with a data server selected from the available data servers for receiving the specific data; and in accordance with a determination that the first socket is not established, send a plurality of communication requests to a plurality of secondary servers according to a predetermined order, until the client machine receives the information concerning the available data servers or the specific data.

Other embodiments and advantages may be apparent to those skilled in the art in light of the descriptions and drawings in this specification.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Figure 1:
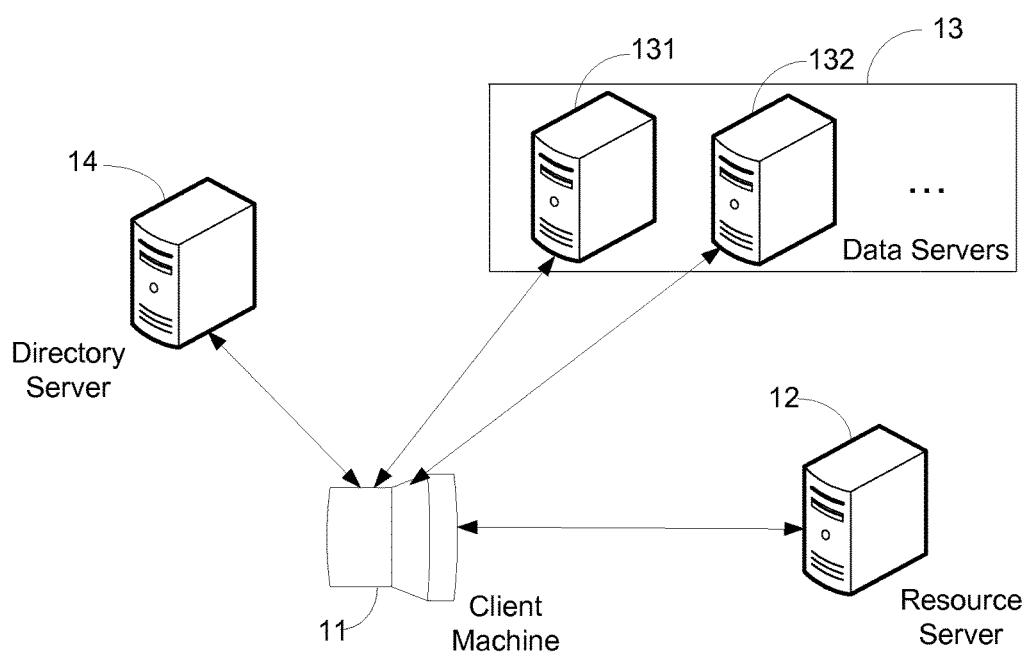
FIG. 1 illustrates an existing communication system that is configured to support a gaming application.
Figure 2:
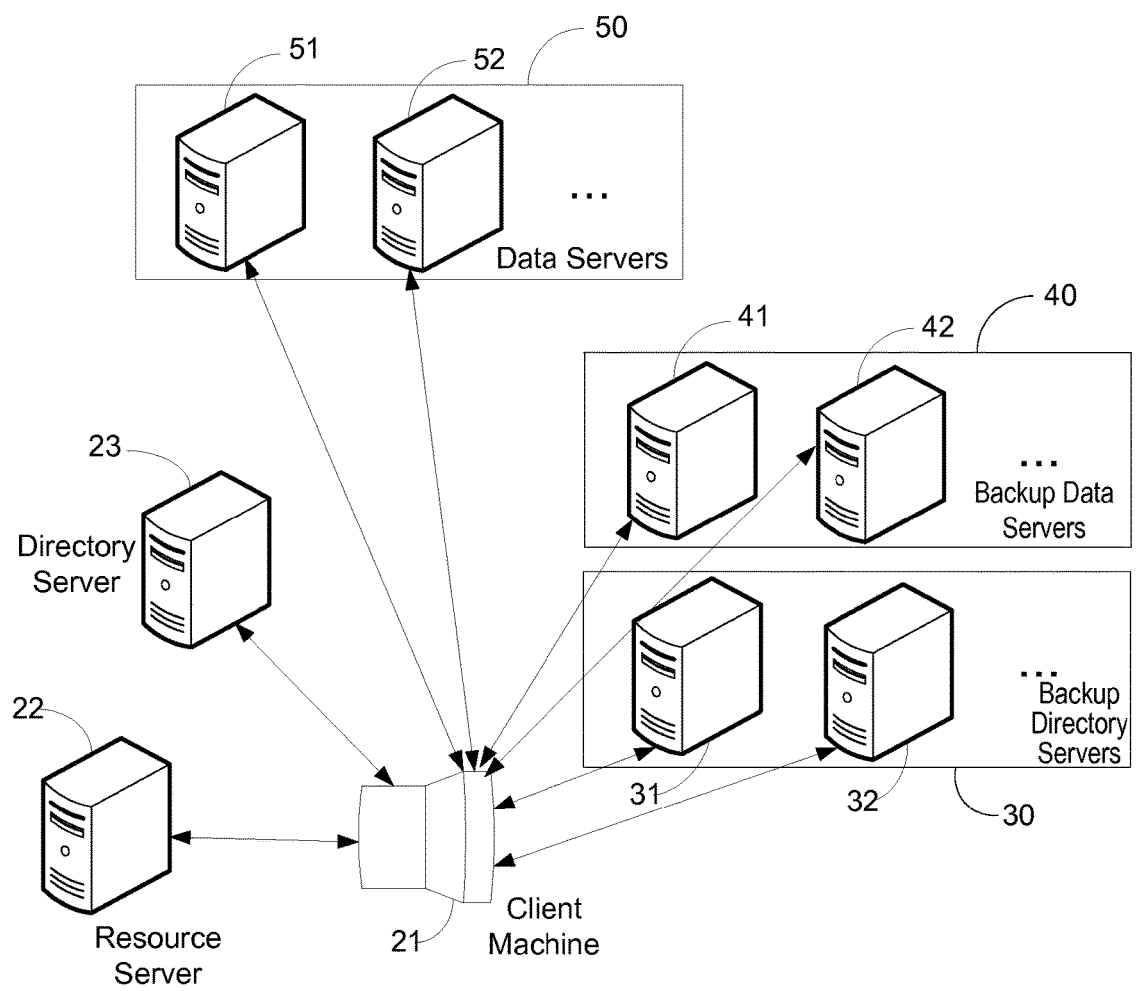
FIG. 2 illustrates a block diagram of a communication system according to some embodiments in the invention.

FIG. 2 illustrates a block diagram of a communication system 200 according to some embodiments in the invention. The communication system 200 includes a client machine 21, a resource server 22, a directory server 23, a plurality of data servers 50 and a plurality of secondary servers that further include backup directory server 30 and backup data server 40. Communication system 200 is configured to provide source programs and application data that are used to run an application on client machine 21. In some embodiments, the application is an online game application, such as a massively multiplayer online role-playing game, which has to be played over a computer network. In this instance, client machine 21 receives from these servers 22-50 both the source programs of the game application and real-time data concerning the game environments.

In many implementations, the application run by client machine 21 may be sponsored by more than one service provider, and exemplary service providers include China Telecom, China Netcom and China Tietong. Each service provider manages its own backup directory server(s) 30, backup data server(s) 40 and data server(s) 50. Typically, client machine 21 is registered with one particular service provider, and has to establish communication with servers sponsored by the particular service provider that it is registered with. In some implementations, backup directory servers 30 include at least two backup directory servers that are associated with two distinct service providers. Similarly, in some implementations, backup data servers 40 include at least two backup data servers that are associated with two distinct service providers, and so are data servers 50.

Client machine 21 downloads or updates the source programs from resource server 22. In some implementations, client machine does not wait for the downloading or updating operation to be completed, but rather sends a communication request to directory server 23 while the download operation is still running. Such a concurrent arrangement reduces the wait time by a user of the application and improves user experience particularly in the online game application.

After it sends the communication request, client machine 21 waits to establish a network socket, also called a communication link, with directory server 23, until a first predetermined period of time expires. In some embodiments, the first predetermined period of time is empirically determined according to the processing time that is normally needed to establish network sockets with directory server 23. Under many circumstances, if it is not set up within the first predetermined period of time, the network socket to communicate with directory server 23 is rarely established thereafter by client machine 21.

The first predetermined period of time is reduced to be less than a default extended period of time described in the background section. In prior art, this default extended period of time is set at a relatively large length, such that client machine 11 and directory server 13 have plenty of time to establish the network socket. In one example, the default extended period of time lasts 20 seconds, and at the end of this extended period of time, directory server 23 returns to client machine 21 a warning message that indicates a failure of establishing a network socket. In some implementations of the present invention, the first predetermined period of time is set to expire earlier before the default extended period of time runs out, e.g., at 10 seconds.

In accordance with a determination that a network socket is established with directory server 23 within the first predetermined period of time, client machine 21 receives information concerning available data servers 50, such as a list of IP addresses. In some implementations, the available data servers 50 include more than one server, including server 51 and server 52, that are sponsored by different service providers. Client machine 21 selects one of the available data servers 50, and establishes a target socket to receive specific data from the selected data server. In some embodiments, client machine 21 successively requests to establish the target socket with each of the available data servers 50 based on the information concerning the available data servers, until the target socket is successfully established with one of the available data servers 50.

In accordance with a determination that a network socket is not established with directory server 23 within the first predetermined period of time, client machine 21 further sends communication requests to a list of predetermined secondary servers according to a predetermined order. In some embodiments, in accordance with the predetermined order, client machine 21 successively requests to communicate with backup directory servers 30 and backup data servers 40, until client machine 23 receives the information concerning available data servers 50 or the specific data. Alternatively, in some embodiments, client machine 21 concurrently, rather than successively, requests to communicate with backup directory servers 30 and backup data servers 40, until client machine 23 receives from one of these servers the information concerning available data servers 50 or the specific data.

In some embodiments, client machine 21 requests to communicate with backup directory servers 30, and waits to establish a socket with one of backup directory servers 30 until the socket is established or a second predetermined period of time expires. If this socket is established, the one of backup directory servers 30 provides similar information concerning some, if not all, of the available data servers 50, such that the target socket may still be established between client machine 21 and one of the available data servers 50 to transfer the specific data required for operating the corresponding application on client machine 21.

In some embodiments, client machine 21 requests to communicate with backup data server 40 and waits to establish a target socket with one of backup data server 40, until the target socket is established or a third predetermined period of time expires. If the target socket is established, the one of backup data server 40 provides client machine 21 with the specific data that are required for operating the corresponding application on client machine 21.

In some embodiments, the second and third predetermined periods of time are smaller than the default extended period of time described above. When sockets fail to be established with any of backup directory servers 30 and backup data servers 40, client machine 21 generates a warning message that indicates a failure of establishing a target socket to receive the specific data and start the application properly.

In accordance with various embodiments of the present invention, rather than entirely relying on directory server 23, communication system 200 attempts to get in touch with more than one server and particularly more than one type of servers to obtain the information concerning the available data servers within the same, if not shortened, period of time. Based on the predetermined order set for the more than one type of servers, a probability of identifying the information concerning the available data servers is enhanced for communication system 200, resulting in a shortened wait time for the user who uses the application. Thus, the user experiences with the application may be significantly improved as well.

Figure 3:
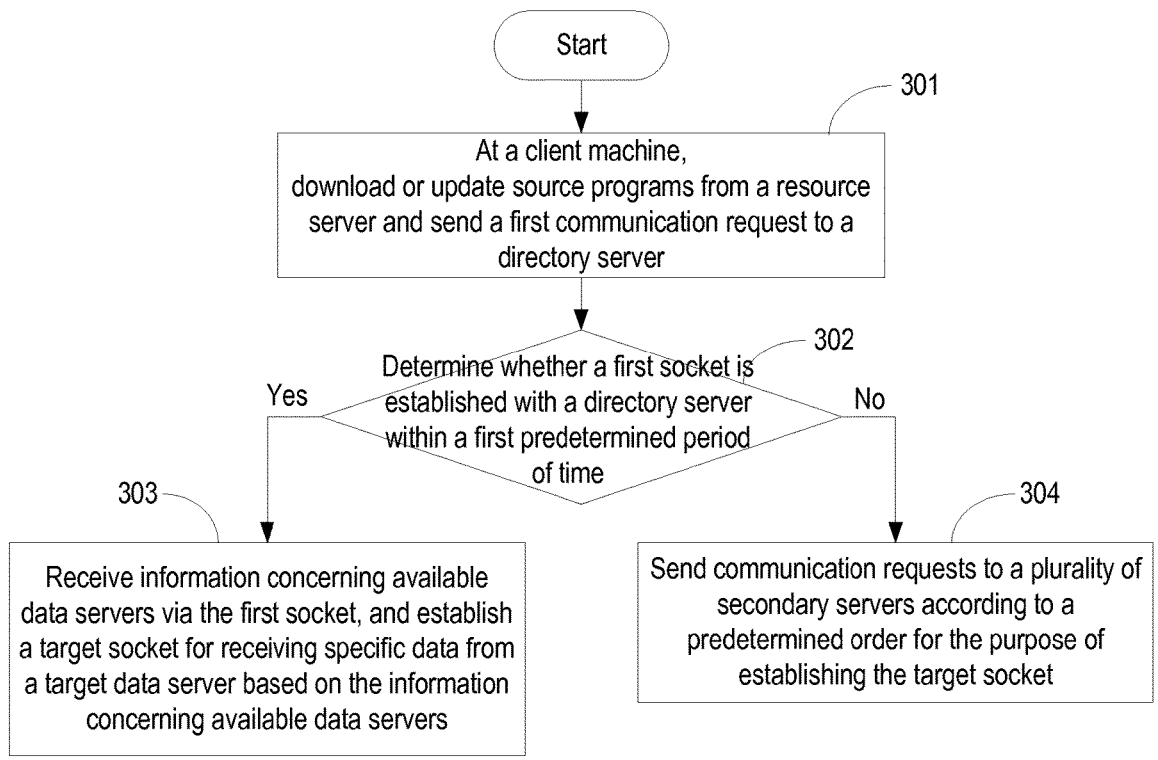
FIG. 3 illustrates a flow chart of a method for identifying an available data server based on a directory server according to some embodiments in the invention.

FIG. 3 illustrates a flow chart of a method 300 for identifying an available data server based on a directory server according to some embodiments in the invention. Method 300 is described from the perspective of a client machine 21. Client machine 21 downloads (301) or updates source programs from a resource server 22, and sends (301) a first communication request to a directory server 23. In some implementations, the first communication request is sent concurrently with the start of the downloading/updating operation; however, in some implementations, the first communication request is sent after the start, but before the conclusion, of the downloading/updating operation.

After sending the first communication request, client machine 21 determines (302) whether a first socket is established with a directory server 23 within a first predetermined period of time. On one hand, when the first socket is successfully established, client machine 21 receives (303) information concerning available data servers via the first socket and establishes a target socket to receive specific data from a target data server. The target data server is selected from the available data servers, and identified according to the information concerning the available data servers. In some implementations, the information concerning the available data servers includes a list of IP addresses for the available data servers. Client machine 21 further sends data communication requests to the target data server, and establishes the target socket based on the information concerning the available data servers for the purpose of receiving the application data used to run the application.

On the other hand, when the first socket is not established between client machine 21 and directory server 23 within the first predetermined period of time, client machine 21 sends (304) a plurality of communication requests to a plurality of secondary servers according to a predetermined order for the purpose of establishing the target socket. In many embodiments, the secondary servers include backup directory servers 30 and backup data servers 40, each including servers sponsored by more than one service providers. More details concerning step 304 (i.e., sending communication requests to a plurality of secondary servers) are provided in the following descriptions with respect to FIGS. 4-6.

In some embodiments, in accordance with the predetermined order, backup directory servers 30 and backup data servers 40 successively receive communication requests sent by client machine 21 after the determination that the first socket is not established between client machine 21 and directory server 23 within the first predetermined period of time. In some embodiments, in accordance with the predetermined order, backup data servers 40, backup directory servers 30 and one of data servers 50 successively receive communication requests sent by client machine 21 after the determination that the first socket is not established. In some embodiments, in accordance with the predetermined order, backup data servers 40 receive communication requests sent by client machine 21 after the determination that the first socket is not established. In some embodiments, backup data servers 40, backup directory servers 30 and one of data servers 50 successively receive communication requests sent by client machine 21 after the same determination that the first socket is not established.

Figure 4:
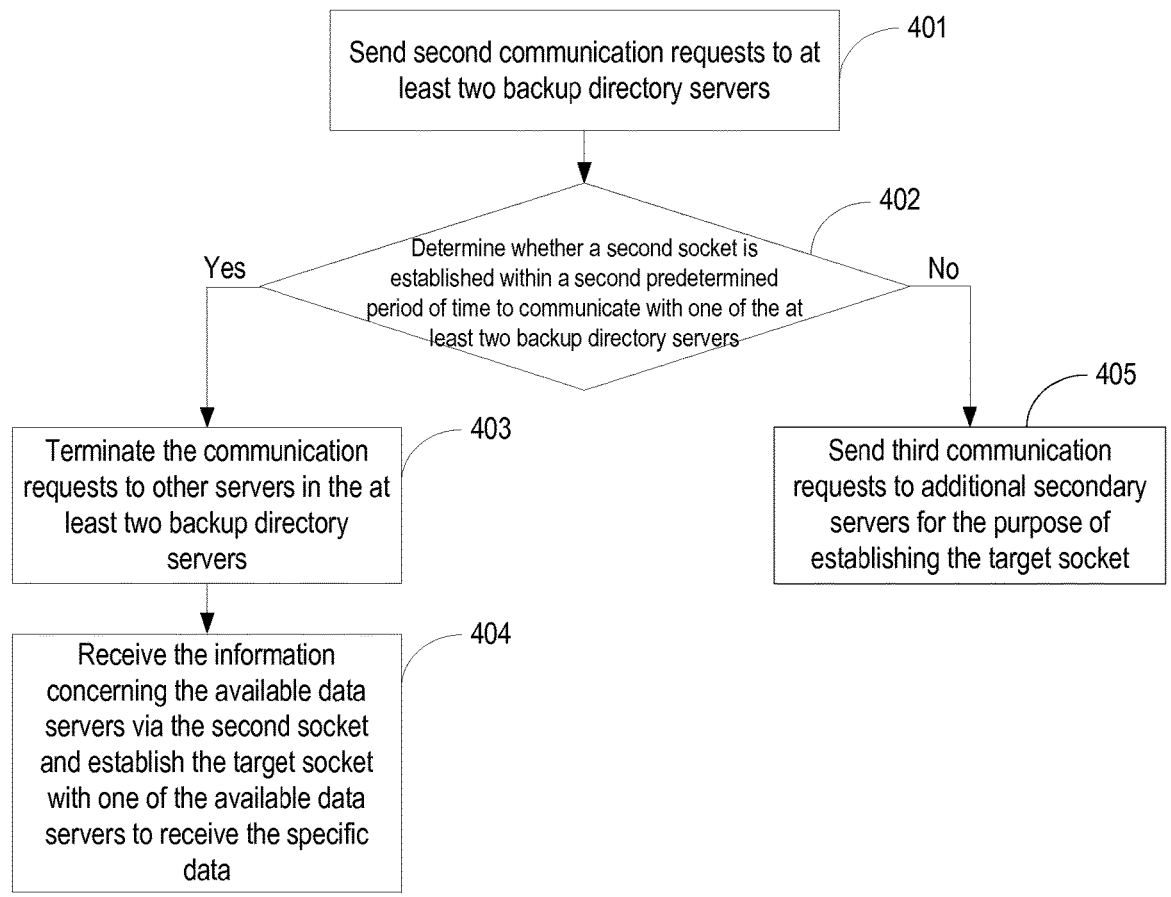
FIG. 4 illustrates a flow chart of a method of identifying an available data server based on a plurality of secondary servers, including backup directory servers, according to some embodiments in the invention.

FIG. 4 illustrates a flow chart of an exemplary method 304 of identifying an available data server based on a plurality of secondary servers, including backup directory servers 30, according to some embodiments in the invention. In accordance with the predetermined order, after failing to communicate with directory server 23 within the first determined period of time, client machine 21 then sends (401) second communication requests to at least two backup directory servers 30. In some embodiments, backup directory servers 30 are respectively managed by different service providers, such as China Telecom, China Netcom and China Tietong, and each backup directory server 30 maintains information concerning available data servers sponsored by the respective service provider.

In some situations, the second communication requests are sent concurrently to different backup directory servers 30. However, in other situations, the second communication requests are arranged in accordance with a part of the predetermined order, and successively sent to backup directory servers 30.

After sending the second communication requests, client machine 21 determines (402) whether a second socket is established within a second predetermined period of time to communicate with one of backup directory servers 30. In accordance with a determination that the second socket is established, client machine 21 terminates (403) some of the second communication requests sent to the other servers in backup directory servers 30. Client machine 21 then receives (404) the information concerning the available data servers, such as a list of IP addresses, via the second socket, and thereby, establishes the target socket with one of the available data servers to receive the specific data.

However, in accordance with a determination that none of the second communication requests has resulted in the second socket within the second predetermined period of time, client machine 21 further sends (405) third communication requests to additional secondary servers, e.g., backup data servers 40, for the purpose of establishing the target socket with a certain available data server.

Figure 5:
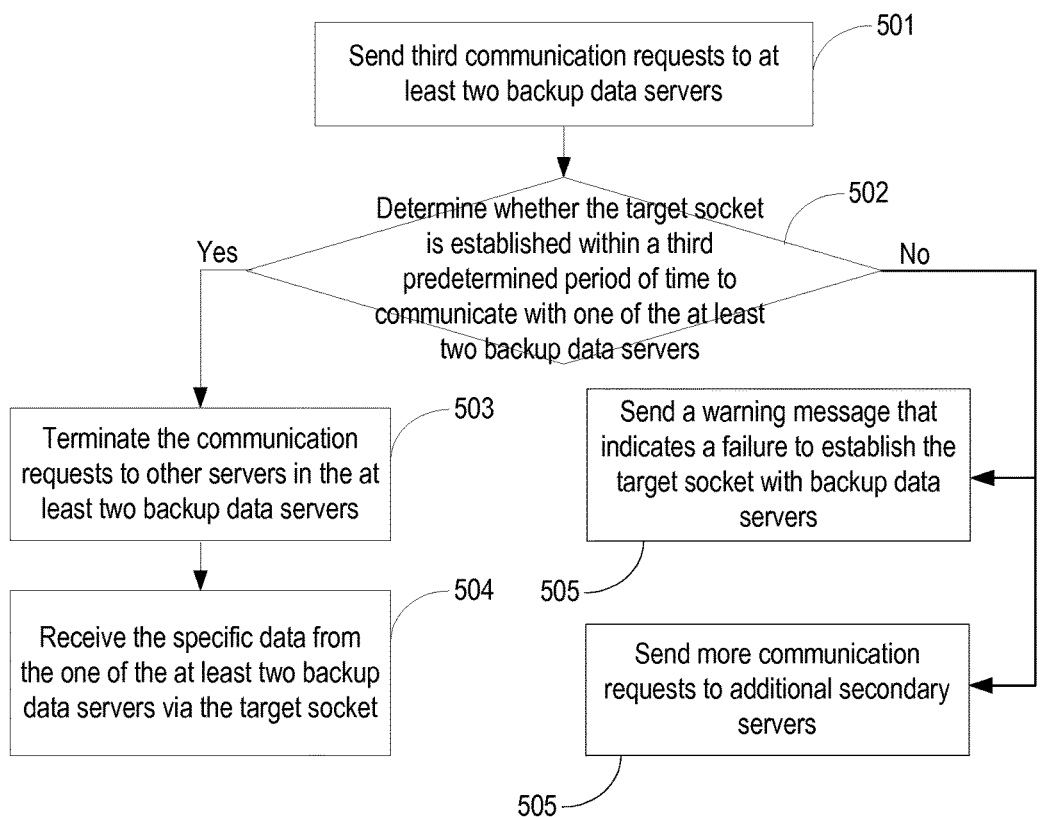
FIG. 5 illustrates a flow chart of a method of identifying an available data server based on a plurality of secondary servers, including backup data servers, according to some embodiments in the invention.

FIG. 5 illustrates a flow chart of an exemplary method 500 of identifying an available data server based on a plurality of secondary servers, including backup data servers 40, according to some embodiments in the invention.

In some implementations, method 500 is applied before sending second data communication requests to at least two backup directory servers 30 according to method 400. Optionally, if a target socket is established with one of backup data servers 40 as a result of method 500, method 400 is not implemented, and the corresponding second communication requests are not sent to backup directory servers 30. In accordance with a predetermined order, after failing to establish the first socket with directory server 23, client machine 21 then sends (501) third communication requests to at least two backup data servers 40. Therefore, in accordance with the predetermined order, directory server 23, backup data servers 40 and optionally backup directory servers 30 successively receive communication requests sent by client machine 21 for the purpose of establishing the target socket between client machine 21 and a data server that is available to provide the corresponding application data to client machine 21.

Alternatively, in some embodiments, method 500 is implemented as operation 405 in method 400, after a determination that the second socket is not established between client machine 21 and backup directory servers 30 within the second predetermined period of time in operation 402. Still, in accordance with a predetermined order, after failing to establish both the first socket with directory server 23 and the second socket with at least one of backup directory server 30, client machine 21 sends (501) third communication requests to at least two backup data servers 40. Therefore, in accordance with the predetermined order, directory server 23, backup directory servers 30 and backup data servers 40 successively receive communication requests sent by client machine 21 for the purpose of establishing the target socket to receive the application data from a certain data server.

In some embodiments, backup data servers 40 are respectively managed by different service providers, such as China Telecom, China Netcom and China Tietong, and each backup data server 40 sponsored by the respective service provider provides its version of application data that are used to run the application.

In some situations, the third communication requests are sent concurrently to different backup data servers 40. However, in other situations, the second communication requests are arranged in accordance with a part of the predetermined order, and successively sent to backup data servers 40.

After sending the third communication requests, client machine 21 determines (502) whether a target socket is established within a third predetermined period of time to communicate with one of backup data servers 40. In accordance with a determination that the target socket is established, client machine 21 terminates (503) some of the third communication requests sent to the other backup data servers in the at least two backup data servers 40. Client machine 21 then receives (504) specific data, such as the application data used for running the application, from the one of the at least two backup data servers 40 via the target socket.

In some embodiment, in accordance with a determination that none of the third communication requests has resulted in the target socket within the third predetermined period of time, client machine 21 sends (505) a warning message that indicates a failure to establish the target socket with data servers, including data servers 50 and backup data servers 40.

In contrast, in some embodiments, in accordance with the determination that none of the third communication requests has resulted in the target socket, client machine 21 further sends (506) more communication requests to additional secondary servers. In some situations, the additional secondary servers include backup directory servers 30, because client machine 21 has not sent communication requests to backup directory servers 30 yet.

Furthermore, in some embodiments, methods 400 and 500 are implemented in parallel after the first socket is not established between client machine 21 and directory machine 23 within the first predetermined period of time.

Figure 6:
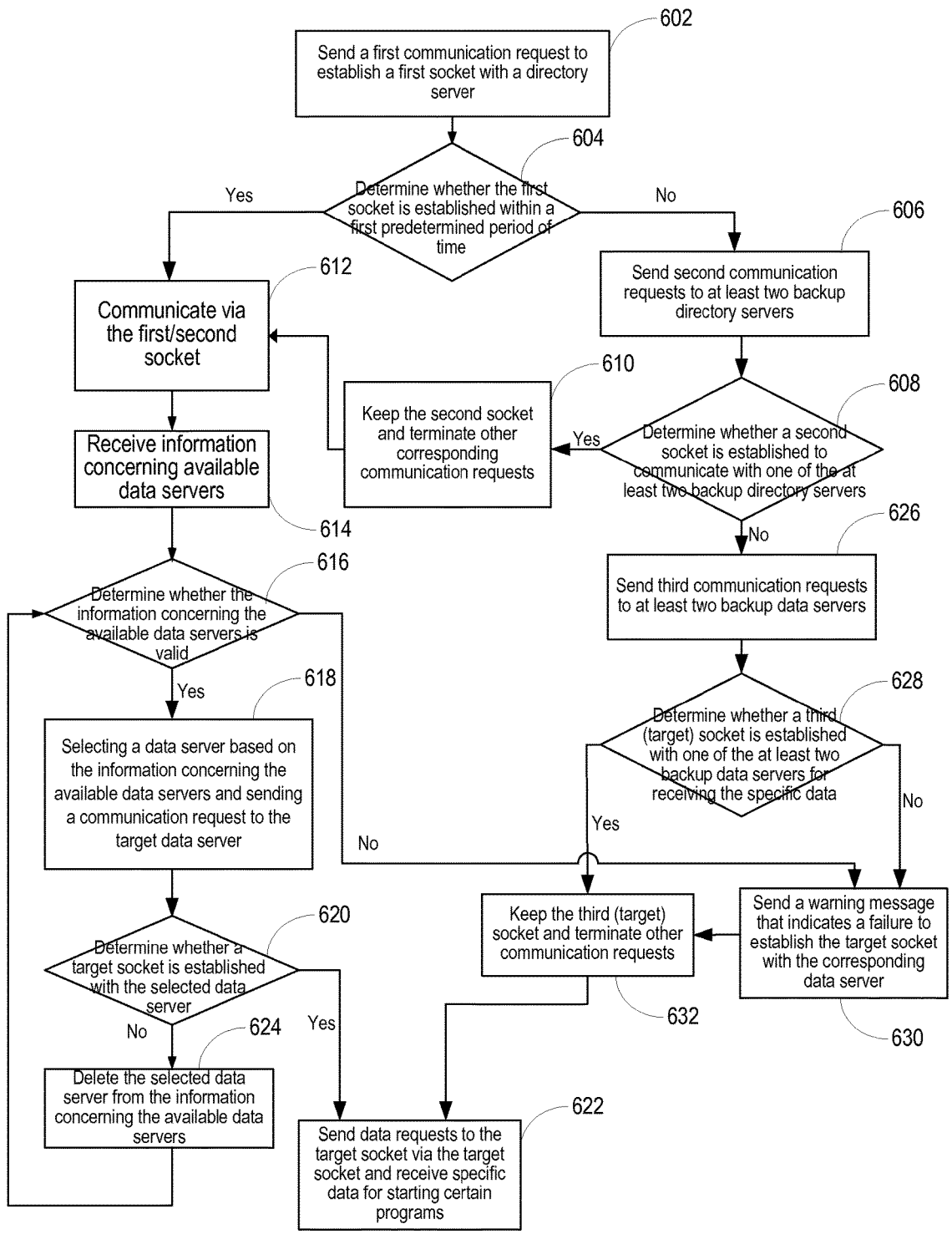
FIG. 6 illustrates a flow chart of a method of identifying an available data server among a plurality of data servers based on a predetermined order according to some embodiments in the invention.

FIG. 6 illustrates a flow chart of a method 600 of identifying an available data server among a plurality of data servers based on a predetermined order according to some embodiments in the invention. Client machine 21 sends (602) a first communication request to establish a first socket with a directory server 23. In some embodiments, client machine 21 and directory server 23 are identified according to their respective IP addresses in a domain name system (DNS). After sending the first communication request, client machine 21 determines (604) whether the first socket is established within a first predetermined period of time.

In accordance with a determination that the first socket is not so established, client machine 21 sends (606) second communication requests to at least two backup directory servers 30. In some embodiments, the second communication requests are sent concurrently, and in some embodiments, they are sent according to a certain order that is regarded as a part of the predetermined order. After sending the second communication requests, client machine 21 further determines (608) whether a second socket is established to communicate with one of the at least two backup directory servers 30. In some situations, the determination is made within a second predetermined period of time.

In accordance with a determination that the second socket is established, client machine 30 keeps (610) the second socket and terminates (610) other corresponding communication requests. Further in accordance with this determination that the second socket is established, client machine 21 communicates (612) with the one of the at least two backup directory servers 30 via the second socket. Similarly, in accordance with another determination that the first socket is established, client machine 21 communicates (612) with directory server 23 via the first socket.

Client machine 21 receives (614) information concerning available data servers 50, e.g., a list of IP addresses for the available data servers 50, and then determines (616) whether the information concerning available data servers 50 is valid. In accordance with a determination that the information concerning available data servers 50 is not valid, client machine 21 sends (630) a warning message that indicates a failure to establish the target socket with the corresponding data server. On the other hand, in accordance with a determination that the information concerning available data servers 50 is valid, client machine 21 selects (618) a data server based on the information concerning available data servers 50, and sends (618) a data communication request to the selected data server. In one instance, the target data server is selected according to the first IP address in the list of IP addresses for the available data servers 50.

After sending the data communication request, client machine 21 determines (620) whether a target socket is established between client machine 21 and the selected data server. In accordance with a determination that the target socket is established, client machine 21 sends (622) data requests via the target socket to request specific data, and receives (622) the specific data for starting certain programs (i.e., application data to start an application, such as an online game application). In accordance with a determination that the target socket is not established, the selected data server is deleted (624) from the information concerning the available data servers 50. Then, client machine 21 repeats operations 616, 618 and 620 successively until the target socket is established with one of the available data servers 50.

Under some circumstances, after determining that the second socket is not established at operation 608, client machine 21 sends (626) third communication requests to at least two backup data servers 40. In some embodiments, the third communication requests are sent concurrently to backup data servers 40, and in some embodiments, they are sent according to a certain order that is regarded as a part of the predetermined order.

Client machine further determines (628) whether a target socket is established with one of the at least two backup data servers 40 for receiving the specific data. In some situations, the determination is made within a third predetermined period of time. In accordance with a determination that the third socket is not so established, client machine 21 sends (630) a warning message that indicates a failure to establish the target socket with the corresponding data server. On the other hand, in accordance with a determination that the third socket is established, client machine 30 keeps (632) the target socket and terminates (632) other corresponding communication requests. Further in accordance with this determination that the target socket is established, client machine 21 sends (622) data requests via the target socket and receives (622) specific data for starting certain programs (i.e., application data to start an application, such as an online game application), as described above.

In many implementations, the first, second and third predetermined periods of time are determined by the application that uses the specific data received from available data servers. For instance, these predetermined periods of time are determined by a specific online game application that runs on client machine 21. Additional details and examples for the method of determining the first, second and third predetermined periods of time are explained above with reference to the description of FIG. 2.

Figure 7A:
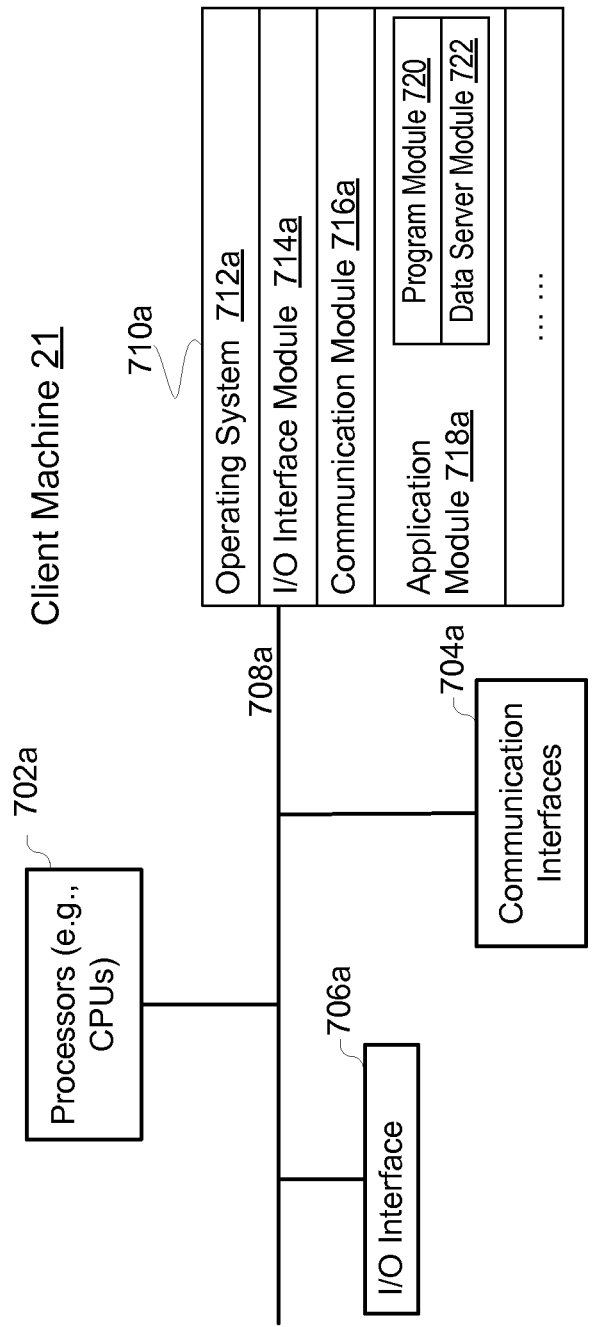
FIG. 7A illustrates a block diagram of a computer system, such as a client machine, according to some embodiments in the invention.

FIG. 7A illustrates a block diagram of a computer system, such as client machine 21, according to some embodiments in the invention. Client machine 21 typically includes one or more processing units 702*a* (sometimes called CPUs or processors) for executing programs (e.g., programs stored in memory 710*a*), one or more communication interfaces 704*a*, memory 710*a*, an input/output (I/O) interface 706*a* (e.g., touch screen, keypads, camera, display screen), and one or more communication buses 708*a* for interconnecting these components. Memory 710*a* includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 710*a* optionally includes one or more storage devices remotely located from the CPU(s) 702*a*. Memory 710*a*, or alternately the non-volatile memory device(s) within memory 710*a*, includes a non-transitory computer readable storage medium. In some embodiments, memory 710*a* or the computer readable storage medium of memory 710*a* stores the following programs, modules and data structures, or a subset thereof:

an operating system 712*a* that includes procedures for handling various basic system services and for performing hardware dependent tasks;

a communication module 714*a* that is used for coupling client machine 21 to other devices via the one or more communication interfaces 704*a* (wired or wireless) and one or more communication networks, such as the Internet, other wide area networks, local area networks, metropolitan area networks, and so on;

an optional I/O interface module 716*a* that receives commands from the user via input devices and generates user interface objects in the display device; and an application module 718*a* that runs a specific application on client machine 21, as described herein.

The application module 718*a* further includes a program module 720 and a data server module 722. Program module 720 controls the establishing of a network socket between client machine 21 and a resource server 22. When such a network socket is established, program module 720 manages the downloading and updating of a source program that is used to run the specific application on client machine 21. As one specific example, client machine 21 is used as a game terminal in an internet game, and optionally, sustains a flash-based gaming interface. Program module 720 manages to establish a network socket between client machine 21 and resource server 22. Via the network socket, program module 720 controls client machine 21 to download the source programs or patches, or update the source programs or patches that are used to run a corresponding game application.

Additionally, data server module 722 controls the establishing of a network socket between client machine 21 and a target data server, and receives application data of the specific application during the course of running the specific application. In accordance with many embodiments, data server module 722 identities the target data server by communicating with a directory server 23. When the communication with directory data server 23 fails, data server module 722 further communicates with some of backup directory servers 30 and backup data servers 40 according to a predetermined order, until the target data server is identified. For corresponding examples of the predetermined order, see FIGS. 3-6 and the description above of these figures.

As one specific example, client machine 21 is used as a game terminal in an internet game. Data server module 722 manages to establish another network socket, e.g., a target socket as described in FIGS. 2-6, between client machine 21 and a data server that stores data used to set up gaming environments. Via the socket, data server module 722 controls client machine 21 to download the data for gaming environments that are further used to support the corresponding game application.

In some implementations, application module 718a functions together with communication module 716a to establish corresponding network sockets with resource server 22, directory server 23, backup directory servers 30, backup data servers 40 and data servers 50.

Figure 7B:
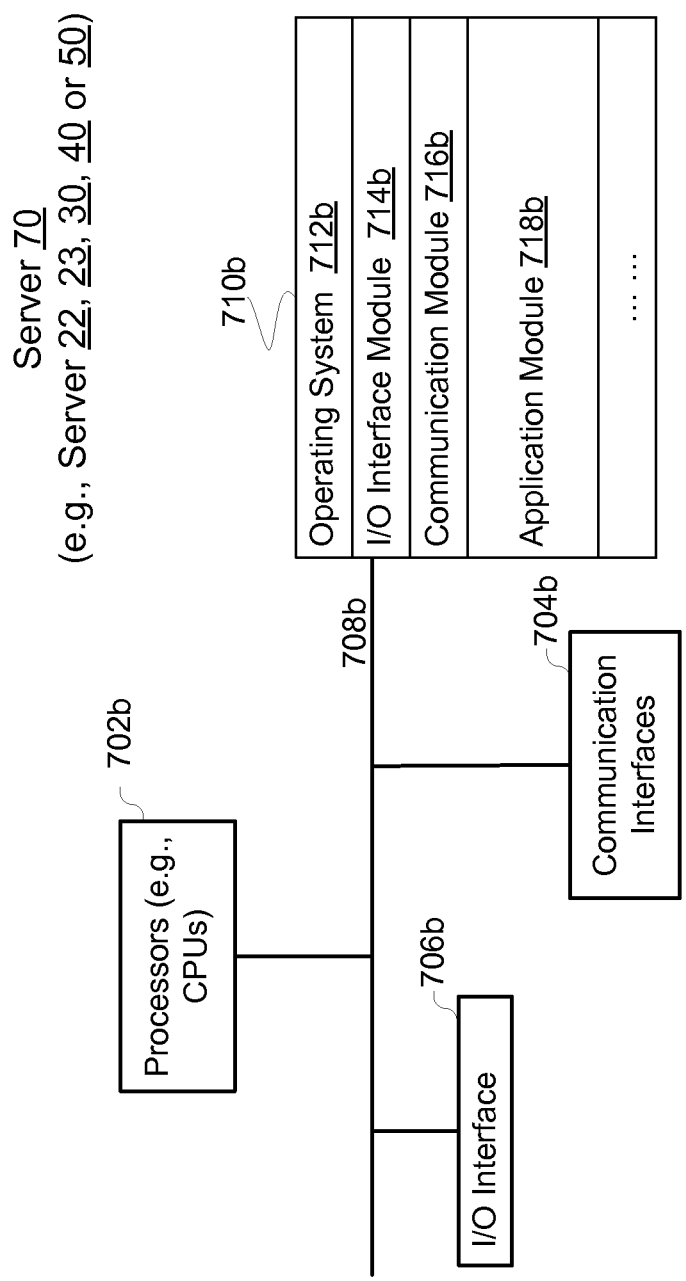
FIG. 7B illustrates a block diagram of a server (such as a resource server, a directory server, a backup directory server, a backup data server and a data server) according to some embodiments in the invention.

FIG. 7B illustrates a block diagram of a server 70 (such as resource server 22, directory server 23, backup directory servers 30, backup data servers 40 and data servers 50) according to some embodiments in the invention. Server 70 typically includes one or more processing units 702b (sometimes called CPUs or processors) for executing programs (e.g., programs stored in memory 710b), one or more communication interfaces 704b, memory 710b, an input/output (I/O) interface 706b (e.g., touch screen, keypads, camera, display screen), and one or more communication buses 708b for interconnecting these components. Memory 710b includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 710b optionally includes one or more storage devices remotely located from the CPU(s) 702b. Memory 710b, or alternately the non-volatile memory device(s) within memory 710b, includes a non-transitory computer readable storage medium. In some embodiments, memory 710b or the computer readable storage medium of memory 710b stores the following programs, modules and data structures, or a subset thereof:

an operating system 712b that includes procedures for handling various basic system services and for performing hardware dependent tasks;

a communication module 714b that is used for coupling client machine 21 to other devices via the one or more communication interfaces 704a (wired or wireless) and one or more communication networks, such as the Internet, other wide area networks, local area networks, metropolitan area networks, and so on;

an optional I/O interface module 716a that receives commands from the user via input devices and generates user interface objects in the display device; and an application module 718a that manages operations related to a specific application on a server side when a network socket is established between client machine 21 and server 70.

In some circumstances where server 70 performs as resource server 22, application module 718a manages to provide source programs or patches to client machine 21. In some circumstances where server 70 performs as directory server 23 or backup directory servers 30, application module 718a generates and provides information concerning available data servers 50 to client machine 21. In some circumstances where server 70 performs as backup data servers 40 and data servers 50, application module 718a generates and provides the application data that are used to run the specific program to client machine 21.

In some embodiments, resource server 22, directory server 23, backup directory servers 30, backup data servers 40 and data servers 50 are configured to support operation of an internet game on many client machines, including client machine 21.

In some implementations, application module 718b functions together with communication module 716b to establish corresponding network sockets with client machine 21.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of establishing communication, comprising:
at a client machine that is registered with a first service provider of an Internet application, wherein the Internet application has a plurality of service providers including the first service provider, and each of the plurality of service providers manages a respective directory server, and a respective set of secondary servers including at least one backup directory server, at least one backup data server and at least one data server:
    sending a first communication request to a directory server associated with the first service provider, the directory server having information concerning available data servers that provide specific data to the client machine;
    determining whether a first socket is established to allow communication with the directory server within a first predetermined period of time, including identifying the client machine and the directory server according to respective IP addresses of the client machine and the directory server in a domain name system;
    in accordance with a determination that the first socket is established, receiving the information concerning the available data servers from the directory server via the first socket and establishing a target socket with one of the available data servers for receiving the specific data, wherein the one of the available data servers is associated with the first service provider; and
    in accordance with a determination that the first socket is not established, sending a plurality of communication requests to a plurality of secondary servers according to a predetermined order, until the client machine receives the information concerning the available data servers or the specific data from one of the plurality of secondary servers that is associated with the first service provider, wherein the plurality of secondary servers are associated with at least two of the plurality of service providers of the Internet application.

2. The method according to claim 1, wherein a first subset of the plurality of secondary servers comprise at least two backup directory servers associated with the at least two of the plurality of service providers, and in accordance with the predetermined order, a first subset of the plurality of communication requests include at least two second communication requests concurrently sent to the at least two backup directory servers.

3. The method according to claim 2, further comprising:
    determining whether a second socket is established to allow communication with one of the at least two backup directory servers within a second predetermined period of time, wherein the one of the at least two backup directory servers is associated with the first service provider;
    in accordance with a determination that the second socket is established, the method further comprising:
        receiving the information concerning the available data servers from the one of the at least two backup directory servers via the second socket; and
        establishing the target socket with one of the available data servers for receiving the specific data, wherein the one of the available data servers is associated with the first service provider.

4. The method according to claim 3, wherein a second subset of the plurality of secondary servers comprise at least two backup data servers associated with the at least two of the plurality of service providers, further comprising:
    in accordance with a determination that the second socket is not established, sending a second subset of the plurality of communication requests to the second subset of the plurality of secondary servers, until the client machine receives the specific data from one of the at least two backup data servers in the second subset of the plurality of secondary servers, wherein the one of the at least two backup data servers is associated with the first service provider.

5. The method according to claim 1, wherein the plurality of secondary servers comprise at least two backup data servers associated with the at least two of the plurality of service providers, and in accordance with the predetermined order, the plurality of communication requests include at least two third communication requests concurrently sent to the at least two backup data servers.

6. The method according to claim 5, further comprising:
    determining whether the target socket is established to allow communication with one of the at least two backup data servers within a third predetermined period of time, wherein the one of the at least two backup data servers is associated with the first service provider; and
    in accordance with a determination that the target socket is established, receiving the specific data from the one of the at least two backup data servers.

7. The method according to claim 1, wherein the client machine includes a game terminal configured to receive the specific data from an available data server or a backup data server in order to operate a game program locally.

8. The method according to claim 1, wherein the client machine downloads a source program configured to operate based on the specific data, when the client machine sends the first communication request to the directory server.

9. The method according to claim 1, wherein the first predetermined period of time lasts for a time selected between 1 second to 10 seconds.

10. The method according to claim 1, wherein the first predetermined period of time is determined by an application configured to use the specific data.

11. A client machine, comprising:
one or more processors; and
memory having instructions stored thereon, which when executed by the one or more processors cause the one or more processors to perform operations, comprising:
    at a client machine that is registered with a first service provider of an Internet application, wherein the Internet application has a plurality of service providers including the first service provider, and each of the plurality of service providers manages a respective directory server, and a respective set of secondary servers including at least one backup directory server, at least one backup data server and at least one data server:
        sending a first communication request to a directory server associated with the first service provider, the directory server having information concerning available data servers that provide specific data to the client machine;
        determining whether a first socket is established to allow communication with the directory server within a first predetermined period of time, including identifying the client machine and the directory server according to respective IP addresses of the client machine and the directory server in a domain name system;

in accordance with a determination that the first socket is established, receiving the information concerning the available data servers from the directory server via the first socket and establishing a target socket with one of the available data servers for receiving the specific data, wherein the one of the available data servers is associated with the first service provider; and in accordance with a determination that the first socket is not established, sending a plurality of communication requests to a plurality of secondary servers according to a predetermined order, until the client machine receives the information concerning the available data servers or the specific data from one of the plurality of secondary servers that is associated with the first service provider, wherein the plurality of secondary servers are associated with at least two of the plurality of service providers of the Internet application.

12. The client machine according to claim 11, wherein the plurality of secondary servers comprise at least two backup data servers associated with the at least two of the plurality of service providers, and in accordance with the predetermined order, the plurality of communication requests include at least two third communication requests concurrently sent to the at least two backup data servers.

13. The client machine according to claim 12, further comprising:

determining whether the target socket is established to allow communication with one of the at least two backup data servers within a third predetermined period of time, wherein the one of the at least two backup data servers is associated with the first service provider; and in accordance with a determination that the target socket is established, receiving the specific data from the one of the at least two backup data servers.

14. The client machine according to claim 11, wherein the client machine is a game terminal configured to receive the specific data from an available data server or a backup data server in order to operate a game program locally.

15. The client machine according to claim 11, wherein the client machine downloads a source program configured to operate based on the specific data, when the client machine sends the first communication request to the directory server.

16. The client machine according to claim 11, wherein the first predetermined period of time is determined by an application configured to use the specific data.

17. A non-transitory computer-readable medium, having instructions stored thereon, which when executed by one or more processors cause the one or more processors to perform operations comprising:

at a client machine that is registered with a first service provider of an Internet application, wherein the Internet application has a plurality of service providers including the first service provider, and each of the plurality of service providers manages a respective directory server, and a respective set of secondary servers including at least one backup directory server, at least one backup data server and at least one data server:

sending a first communication request to a directory server associated with the first service provider, the directory server having information concerning available data servers that provide specific data to the client machine;

determining whether a first socket is established to allow communication with the directory server within a first predetermined period of time, including identifying the client machine and the directory server according to respective IP addresses of the client machine and the directory server in a domain name system;

in accordance with a determination that the first socket is established, receiving the information concerning the available data servers from the directory server via the first socket and establishing a target socket with one of the available data servers for receiving the specific data, wherein the one of the available data servers is associated with the first service provider; and in accordance with a determination that the first socket is not established, sending a plurality of communication requests to a plurality of secondary servers according to a predetermined order, until the client machine receives the information concerning the available data servers or the specific data from one of the plurality of secondary servers that is associated with the first service provider, wherein the plurality of secondary servers are associated with at least two of the plurality of service providers of the Internet application.

18. The non-transitory computer-readable medium according to claim 17, wherein a first subset of the plurality of secondary servers comprise at least two backup directory servers associated with the at least two of the plurality of service providers, and in accordance with the predetermined order, a first subset of the plurality of communication requests include at least two second communication requests concurrently sent to the at least two backup directory servers.

19. The non-transitory computer-readable medium according to claim 18, further comprising:

determining whether a second socket is established to allow communication with one of the at least two backup directory servers within a second predetermined period of time, wherein the one of the at least two backup directory servers is associated with the first service provider;

in accordance with a determination that the second socket is established, the method further comprising:

receiving the information concerning the available data servers from the one of the at least two backup directory servers via the second socket; and establishing the target socket with one of the available data servers for receiving the specific data, wherein the one of the available data servers is associated with the first service provider.

20. The non-transitory computer-readable medium according to claim 19, wherein a second subset of the plurality of secondary servers comprise at least two backup data servers associated with the at least two of the plurality of service providers, further comprising:

in accordance with a determination that the second socket is not established, sending a second subset of the plurality of communication requests to the second subset of the plurality of secondary servers, until the client machine receives the specific data from one of the at least two backup data servers in the second subset of the plurality of secondary servers, wherein the one of the at least two backup data servers is associated with the first service provider.

\* \* \* \* \*